Figure 11:
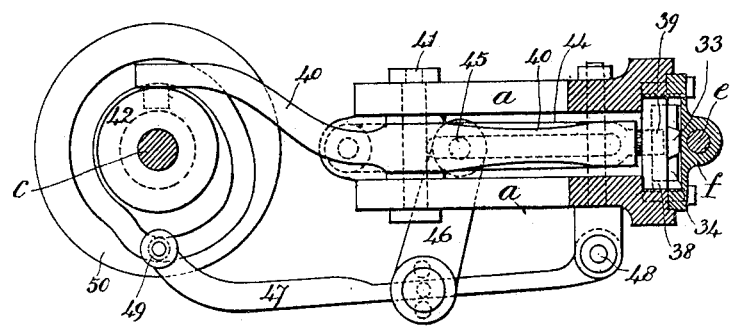

No. 818,766. PATENTED APR. 24, 1906.
J. KEATS, DEC'D.
J. C. KEATS, ADMINISTRATOR.
LASTING AND SEWING MACHINE FOR BOOTS AND SHOES.
APPLICATION FILED MAR. 24, 1904.
6 SHEETS—SHEET 1.
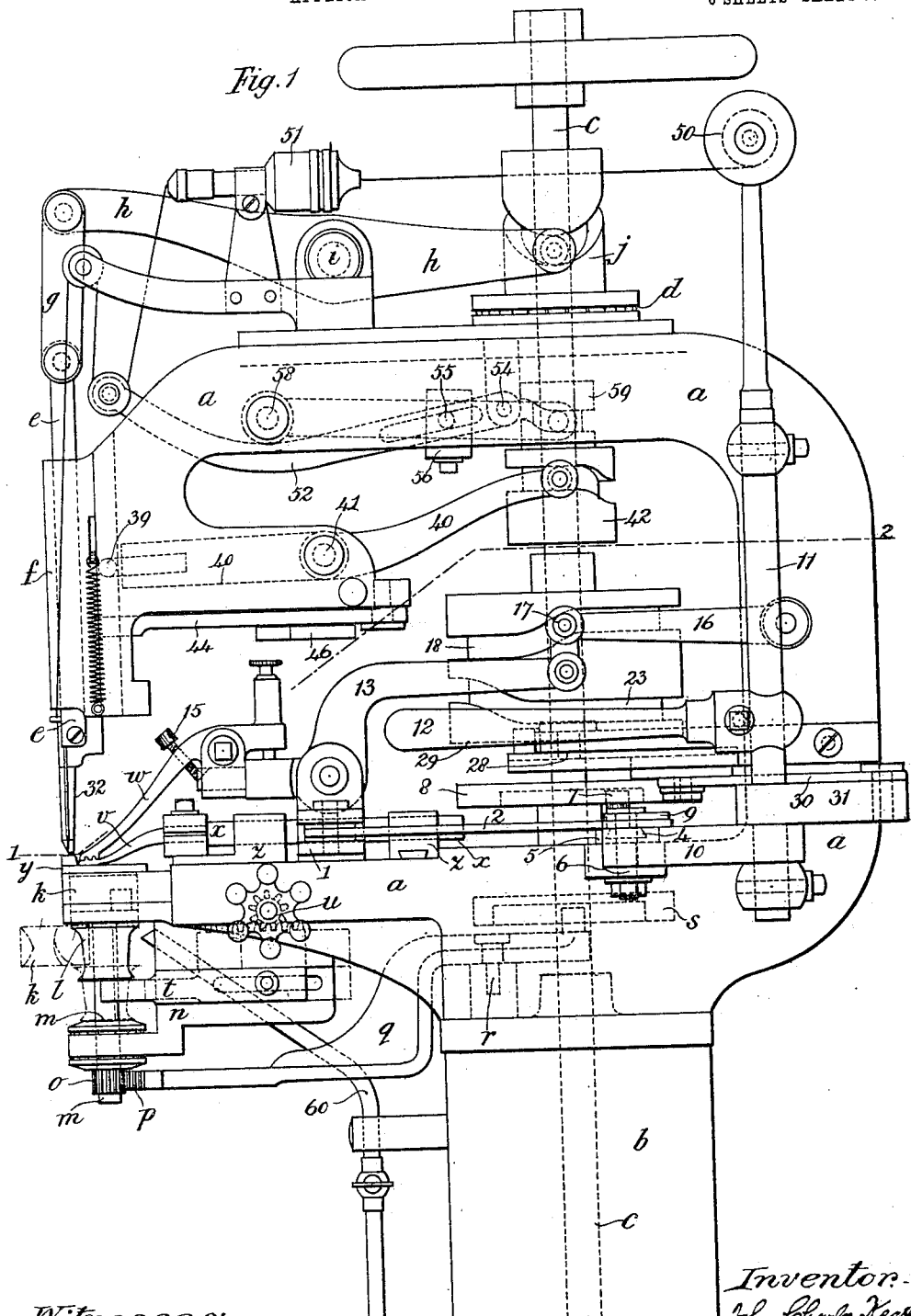

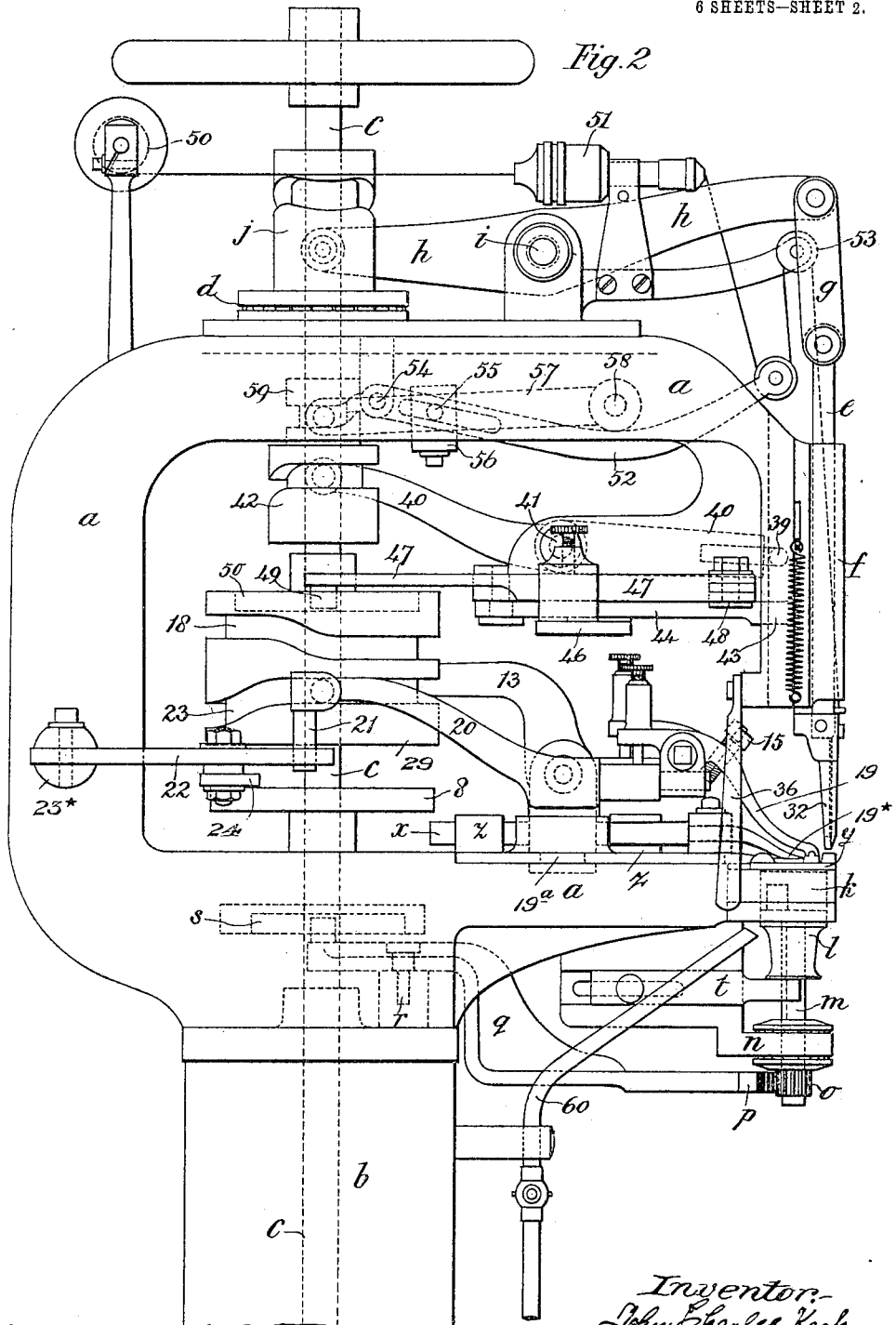

No. 818,766. PATENTED APR. 24, 1906.
J. KEATS, DEC'D.
J. C. KEATS, ADMINISTRATOR.
LASTING AND SEWING MACHINE FOR BOOTS AND SHOES.
APPLICATION FILED MAR. 24, 1904.
6 SHEETS—SHEET 3.
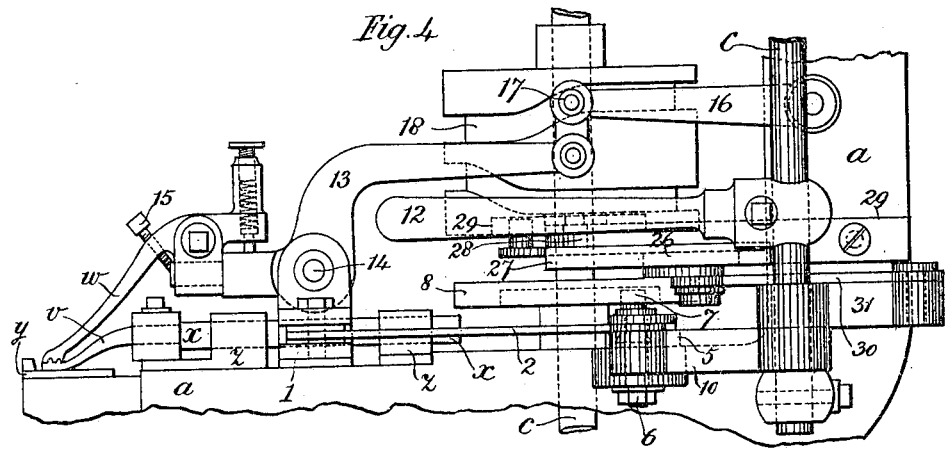
Fig. 4.
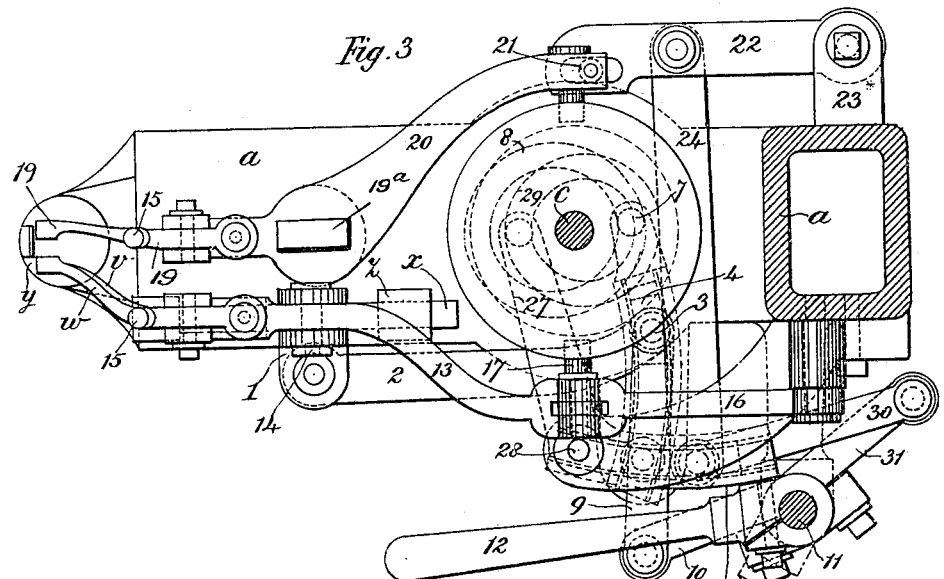
Fig. 3.
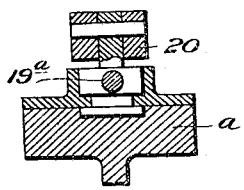
Fig. 3ª.
Witnesses:
Henry Thieme.
J. George Barry.
Inventor
John Charles Keats,
Administrator of Estate of John Keats, Deceased,
By attorneys No. 818,766. PATENTED APR. 24, 1906.
J. KEATS, DEC'D.
J. C. KEATS, ADMINISTRATOR.
LASTING AND SEWING MACHINE FOR BOOTS AND SHOES.
APPLICATION FILED MAR. 24, 1904.
6 SHEETS—SHEET 4.
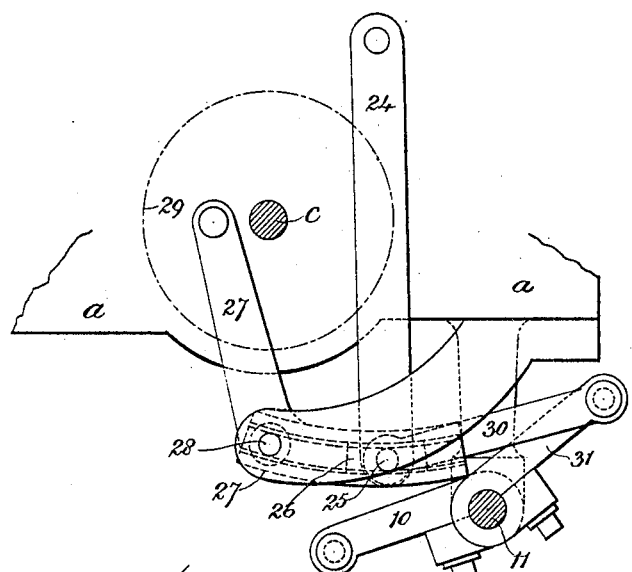
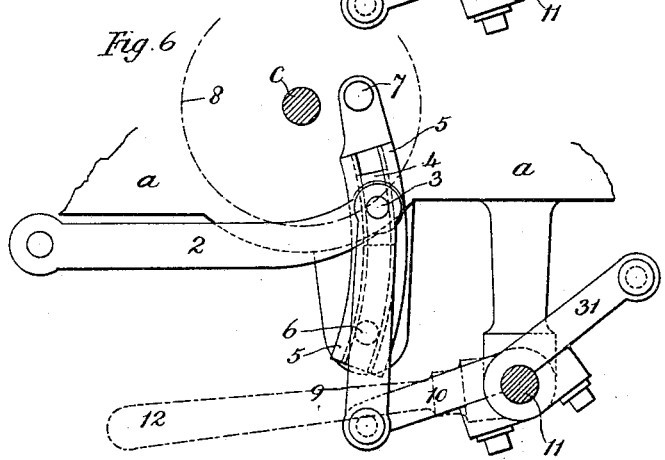

No. 818,766. PATENTED APR. 24, 1906.
J. KEATS, DEC'D.
J. C. KEATS, ADMINISTRATOR.
LASTING AND SEWING MACHINE FOR BOOTS AND SHOES.
APPLICATION FILED MAR. 24, 1904.
6 SHEETS—SHEET 5.
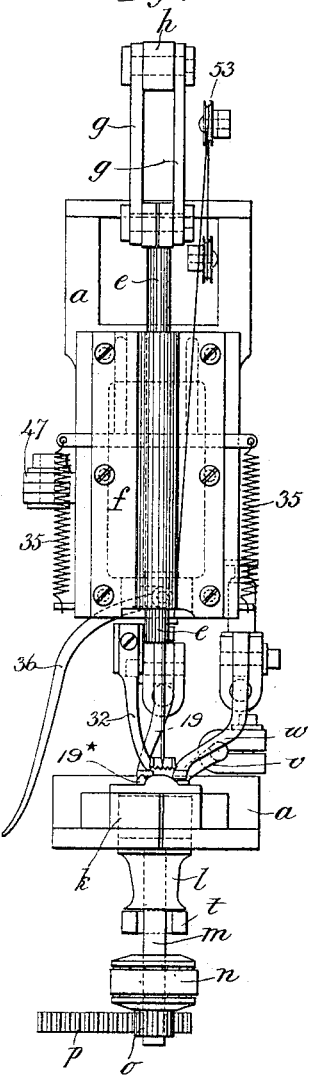
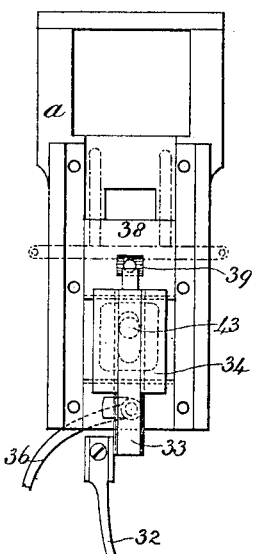
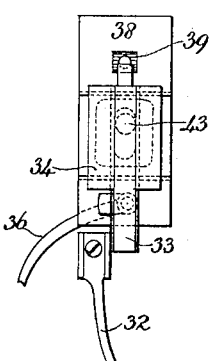
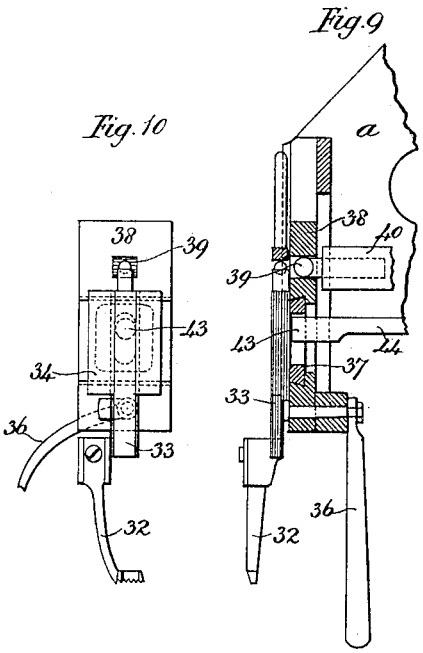
Witnesses:
Henry Thieme.
F. George Barry,
Inventor:
John Charles Keats
Administrator Estate of John Keats, deceased
by his attorneys
Robert Seward No. 818,766. PATENTED APR. 24, 1906.
J. KEATS, DEC'D.
J. C. KEATS, ADMINISTRATOR.
LASTING AND SEWING MACHINE FOR BOOTS AND SHOES.
APPLICATION FILED MAR. 24, 1904.

6 SHEETS—SHEET 6.

Witnesses:
Henry Thieme
F. George Barry

Inventor:
John Charles Keats,
Administrator of Estate of John Keats, Deceased
By his attorneys
Brown & Seward

UNITED STATES PATENT OFFICE.

JOHN CHARLES KEATS, OF NORTHAMPTON, ENGLAND, ADMINISTRATOR OF JOHN KEATS, DECEASED, ASSIGNOR TO THE PHOENIX BOOT MACHINERY COMPANY LIMITED, OF STREET, ENGLAND.

LASTING AND SEWING MACHINE FOR BOOTS AND SHOES.

No. 818,766. Specification of Letters Patent. Patented April 24, 1906.

Application filed March 24, 1904. Serial No. 199,697.

*To all whom it may concern:*

Be it known that I, JOHN CHARLES KEATS, a subject of the King of Great Britain, and a resident of 37 Lutterworth road, Northampton, in the county of Northampton, England, am the administrator of the estate of JOHN KEATS, deceased, late of Bagnall, in the county of Stafford, England, who did invent certain new and useful Improvements in Lasting and Sewing Machines for Boots and Shoes, of which the following is a specification.

The present invention relates to machines for lasting and sewing boots and shoes in one operation, particularly boots and shoes of light material and those which are known as "turned" shoes.

In the specification of British patent granted to John Keats, No. 4,594, March 10, 1900, there was described an attachment for an ordinary shoemaker's sewing-machine by means of which the shoes were lasted at the same time that they were sewed.

According to the present invention the lasting and sewing mechanisms are incorporated into one single machine of a construction admirably adapted for carrying out the combined operation of lasting and sewing turned shoes and similar light goods.

In constructing a lasting and sewing machine embodying these improvements a frame is provided mounted on a pillar or other suitable support. Within the frame is arranged a vertical driving-spindle and means for rotating the same. This spindle carries the cams for actuating the various parts. These parts are adjustably connected, so that the machine may be readily adapted to the requirements and exigencies of the work in progress.

The lasting mechanism comprises, in common with other machines previously described by the inventor above mentioned, two pairs of gripping-jaws, one of which effects the lasting proper—that is to say, pulls the leather tight upon the last—and the other smooths out the creases in a lateral direction. Both these pairs of grippers are attached to a set of levers which is interposed between them and the operating-cams and so arranged that the fulcra to which the said levers are pivoted can be shifted by means of a handle to give to the grippers, respectively, a longitudinal or lateral movement of the extent required for the particular work in hand. The upper jaws of each gripper are flexibly attached, so as to give way if an exceptionally-thick piece of material is gripped, and so avoid fracture, and are provided with set-screws which can be adjusted to prevent the grippers from remaining closed under the impulse of the springs when the upper jaws are intended to be raised. The operation of the grippers is effected positively by the cams without the intervention or assistance of springs in either direction.

The sewing mechanism comprises a straight needle reciprocated by a lever fulcrumed on the framing and rocked to and fro by a cam on the driving-shaft. There is also a tension device for the needle-thread and a draw-off lever which can by shifting the fulcrum be made to measure off the exact quantity of thread necessary for a stitch of any predetermined length. The presser-foot-operating mechanism, which gives the presser-foot a sideway feed, as well as an up-and-down movement, consists of levers positively actuated from the cam-shaft and having in the case of the feed-lever an adjustable link connection by which the feed may be regulated according to requirement. To permit of the presser-foot moving laterally as well as vertically, the operating-levers work in slots in the presser-foot support, and the latter is secured to attachments which are free to move in horizontal and vertical guides, so that the movement in the two directions can take place simultaneously without interference either way.

The shuttle is mounted on a rotary reciprocating carrier which is capable of being lowered out of position to replace an empty spool without deranging the rest of the machine, thus economizing much time. The carrier is capable of sliding on a vertical spindle, but rotates therewith. It is held in its raised position by a sliding fork which can be advanced or retired horizontally as desired. The spindle has at its lower end a pinion engaging with a segment on a rocking lever moved by a cam on the driving-shaft. The position of the shuttle beneath the work permits of the employment of a waxed thread, which can be kept warm by means of a flame.

In constructing the machine it is preferred to arrange for the needle-bar, the vertical pivots of the grippers, and the main driving-shaft to be parallel to one another and in the same vertical plane.

Figure 12:
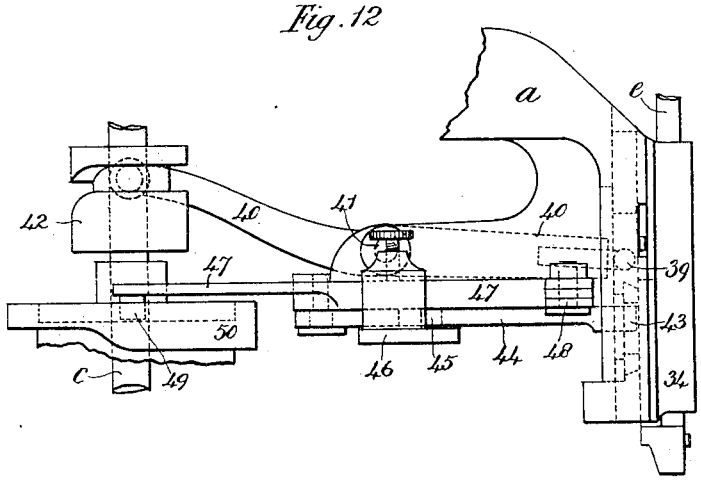

In the accompanying drawings, Figure 1 is an elevation of the right-hand side of a lasting and sewing machine constructed according to this invention. Fig. 2 is a similar view of the left-hand side of the machine. Fig. 3 is a sectional plan view on the line 1 2 of Fig. 1, showing the lasting-grippers and smoothing-grippers and the means for operating the same; and Fig. 3$^a$ is a detail vertical section taken in the plane of the line 1 of Fig. 3. Fig. 4 shows in side view the lasting-grippers with the cams for giving motion thereto. Fig. 5 shows in plan view the arrangement of levers operated by a cam for giving the sideway movement to the smoothing-grippers, and Fig. 6 is a similar view of the mechanism for giving the pull to the lasting-grippers. Fig. 7 is a front view of the needle-bar head, showing the lasting and smoothing grippers in position. Fig. 8 is a similar view with the plate carrying the needle-bar and grippers removed, showing the feeding and presser foot in position. Fig. 9 is a sectional view of the same, and Fig. 10 shows the feeding-foot and guide detached. Fig. 11 is a sectional plan view of the cams and levers for giving an adjustably variable feed-motion to the feeding and presser foot, and Fig. 12 shows the same in side view.

Referring to Figs. 1 and 2, $a$ is the main framing of the machine, consisting of a hollow-box casting bolted at its base to the top of a pillar $b$, which extends down to the floor and is provided with a broad base to afford a firm support to the machine. $c$ is a vertical shaft which receives rotary motion through suitable gearing from any source of power. This shaft $c$ is supported upon ball-bearings $d$ and has keyed upon it cams for transmitting motion to the several parts of the machine. $e$ is the needle-bar, sliding vertically in the head $f$, which is screwed to the front part of the main framing $a$. The bar $e$ is coupled by a pair of links $g\ g$ to the front end of a rock-lever $h$, rocking upon a fulcrum-pin $i$, carried by a bracket secured to the top of the framing $a$. A suitably-grooved cam $j$, keyed to the shaft $c$, serves to impart through a bowl on the rock-lever $h$ the properly-timed reciprocating movement to the needle-bar. $k$ is the shuttle, which rests upon and is driven by the carrier $l$. This carrier is free to slide vertically upon the spindle $m$, to which it is coupled by a groove and feather. The spindle $m$ is supported on ball-bearings held by a bracket $n$, pendent from the main framing, and to its lower end is keyed a pinion $o$, into which gears a sector $p$, formed on the rack-lever $q$. This lever rocks on the fulcrum-pin $r$ and receives its reciprocating motion from the cam $s$, keyed to the shaft $c$.

The shuttle-carrier rests normally upon the forked slide $t$, as shown in Figs. 1 and 2, which keeps the shuttle in its working position. When, however, it is required to remove the shuttle, the forked slide $t$ is withdrawn from the carrier by means of the hand-wheel and pinion $u$, leaving the carrier free to fall and the shuttle to be removed, as indicated by dotted lines at Fig. 1.

In Figs. 3 and 4, $v\ w$ represent a pair of lasting-grippers for pulling the upper-leather tight over the last. The lower gripper $v$ is formed on the end of a sliding rod $x$, and it rests upon and is free to slide over the throat-plate $y$ in its movement of pulling the upper tight and returning to take up the forward position again. The rod $x$ slides in the guides $z\ z$, screwed to the top of the bracket $a$, forming part of the main framing. Secured to the rod $x$ is a block 1, having a pair of lugs standing out horizontally, to which is coupled one end of a link 2. The other end of this link embraces a pin 3, (see Fig. 6,) carried by a sliding piece 4, fitted to slide in a segment 5, which is caused to rock upon the fulcrum-pin 6, carried by a lug standing out from the main framing. The other end of the segment 5 carries a bowl 7, which fits into the groove cut in the face-cam 8. The rotation of this cam gives an unvarying extent of vibration to the segment 5 and through the link 2 the pull to the lasting-grippers; but to enable the operator to regulate at will the extent of such pull the pin 3 of the sliding piece 4 is coupled by link 9 to a lever-arm 10, rigidly fixed to the vertical rod 11. A handle 12, fixed to this rod, enables the operator, through the lever-arm 10 and the link 9, to move the pin 3 nearer to or farther from the fulcrum-pin 6 of the segment 5, and thus give the amount of pull required. The upper lasting-gripper $w$ is coupled elastically to a lever 13, fulcrumed at 14 to a pair of lugs standing up from the block 1. An adjusting-screw 15 insures the lifting of the upper-gripper when the lever is raised. The end of this lever is coupled by a short link to an arm 16, carrying a bowl 17, which engages with the cam 18 on the vertical shaft $c$. The rotation of this cam thus operates the upper-gripper to grip or release the work. The upper and lower smoothing-grippers 19 and 19* are rocked sidewise upon the vertical pivot 19$^a$. The arm 20 of the upper gripper carries a pendent pin 21, which enters a groove in the lever 22, fulcrumed to a lug 23*, standing out from the framing. The lever 22 is coupled by a link 24 to a pin 25, carried by a sliding piece 26, which slides in a segment 27, fulcrumed at 28 to a lug on the framing. The segment is extended beyond the fulcrum 28 and carries a bowl that fits in a groove in the cam 29. By shifting the pin 25 along the groove in the segment 27 by means of the link 30 and arm 31, fixed to rod 11, through the lever 12, the side pull to be given to the smoothing-grippers can be adjusted according to requirement. The lift to the upper smoothing-gripper is effected by the bowl on the end of the lever 20 and cam-groove 23. The lower smoothing-gripper 19* has no vertical movement, but only rocks laterally together with the upper smoothing-gripper 19.

The feeding and presser foot 32 (see Figs. 7 to 10) is carried by a vertically-sliding bar 33, which works in guides 34 and is held down by springs 35, a lifter 36 being provided to raise the presser when required. For giving the horizontal or feeding movement to the presser-foot the guides 34 are attached to a transverse slide 37, which fits in guides in the vertically-sliding piece 38. The presser-foot is lifted at each feed movement by means of the tappet 39, carried by the end of the rock-lever 40, which is fulcrumed to the framing at 41 and carries a bowl that enters the groove of the cam 42 on the shaft $c$. (See Figs. 11 and 12.) The transverse or feeding movement of the presser-foot is effected by the pin 43, formed on the end of the slotted lever-arm 44, which is rocked by a pin 45, carried by the adjustable piece 46, clamped by a set-screw to the rock-lever 47, fulcrumed at 48 on the framing. The lever 47 carries a bowl 49, that fits in the groove of the cam 50. The adjusted position of the piece 46 nearer to or farther from the fulcrum 48 determines the length of stitch of the work in hand. The hole in the transverse slide 37 for the pin 43 is elongated to permit of the lift of the presser-foot.

The thread is led from a bobbin 50 through a tension device 51 and down to the pulley of a draw-off lever 52 and thence up to and over a fixed guide-pulley 53 and then down to the needle. The lever 52, which is fulcrumed at 54 to the framing, is slotted to receive a pin 55, carried by an adjustable piece 56 on the lever 57, fulcrumed at 58 and operated by the cam 59 on the shaft $c$. By adjusting the position of the pin 55 on the lever 57 the draw-off lever 52 is caused to measure off the exact quantity of thread to suit the length of stitch and thickness of the work in hand.

60 is a gas-pipe for providing a flame near the shuttle, by means of which flame the waxed thread therein may be kept warm.

The operation of the machine is as follows: The work is introduced between the throat-plate $y$ and the presser-foot 32 and the machine is started. A stitch is inserted in the work by means of the needle, while the lasting-grippers $w\ v$ take hold of the upper of the shoe and draw it tight on the last. The creases are at the same time removed from the upper by the lateral movement of the smoothing-grippers. The stroke of both sets of grippers as the sewing proceeds is regulated simultaneously as regards length by the hand-lever 12 in the manner above explained. The length of the stitch is set from time to time, as required, by adjusting the position of the piece 46 on the rock-lever 47. Correspondingly the draw-off lever 52 has its fulcrum 55 shifted to regulate the proper supply of thread necessary for each stitch. The locking or shuttle thread is drawn from a cop in the shuttle-case $k$, which when exhausted can be replaced by a fresh one in a very easy manner if the shuttle-carrier be lowered, as above described, to render it accessible without disturbing the rest of the machine.

Certain subject-matter disclosed but not claimed in this application is disclosed and claimed in United States Letters Patent granted to me December 5, 1905, No. 806,744, entitled "Machinery for making boots and shoes."

What I claim as the invention, and desire to secure by Letters Patent, is—

1. In a lasting and sewing machine for boots and shoes comprising sewing and lasting mechanism mounted in one and the same framing and driven by cams on the same shaft, the combination of two pairs of grippers, mechanisms operating the grippers to pull respectively in longitudinal and lateral directions, comprising movable slides, segments supporting said slides, devices for rocking said segments and a hand-lever and connections for simultaneously moving the slides toward or away from the center of motion of said segments to regulate the draft of the grippers, substantially as described.

2. In a lasting and sewing machine, the combination with a presser-foot, vertical and horizontal supporting-slides therefor, levers for operating the presser-foot vertically and horizontally and devices for operating said levers, of a connecting-piece attached to the lever for operating the presser-foot horizontally and to its operating device and means whereby one of said points of attachment of said connecting-piece may be shifted to vary the throw of the lever and adjust the lateral travel of the horizontal slide, substantially as set forth.

3. In a lasting and sewing machine for boots and shoes, lasting-grippers, means for opening and closing their jaws, smoothing-grippers, means for opening and closing their jaws, slides for the lasting and smoothing grippers, devices for connecting the lasting and smoothing grippers pivotally to the said slides, pivoted segments forming guides for the slides, devices for continuously rocking the segments while the machine is at work and means for shifting the slides upon their segments to increase or diminish the stroke of the grippers as required, substantially as described.

In testimony whereof I have signed my name to this specification in the presence of two subscribing witnesses.

JOHN CHARLES KEATS,
*Administrator of the estate of John Keats, deceased.*

Witnesses:
ALFRED V. BISHOP,
H. D. JAMESON.